May 28, 1963 F. J. BIEBER ETAL Re. 25,390

WINDING SPOOL

Original Filed March 21, 1960

INVENTORS
FREDERICK J. BIEBER
CLARENCE I. STEINBACK
BY
Merchant, Merchant & Gould
ATTORNEYS United States Patent Office Re. 25,390
Reissued May 28, 1963

25,390
WINDING SPOOL

Frederick J. Bieber and Clarence I. Steinback, Minneapolis, Minn., assignors to Acrometal Products, Inc., Minneapolis, Minn., a corporation of Minnesota Original No. 2,996,265, dated Aug. 15, 1961, Ser. No. 16,221, Mar. 21, 1960. Application for reissue Oct. 16, 1962, Ser. No. 232,643
3 Claims. (Cl. 242—118.61)

Matter enclosed in heavy brackets [ ] appears in the original patent but forms no part of this reissue specification; matter printed in italics indicates the additions made by reissue.

Our invention relates generally to winding drums or spools for wire and the like and more particularly to spools of the disposable or throw-away type.

The primary object of our invention is the provision of a drum of the class above described which may be mass produced at a relatively low price but which is adequately rugged and durable for the purpose.

A further object of our invention is the provision of a device of the class immediately above described which is sufficiently precise in its dimensions and in the interfitting of its related parts to accomplish the functions for which it was created.

A further object of our invention is the provision of a device of the class described which may be constructed of a minimum of parts and with a minimum of time and effort.

The above and still further objects of our invention will become apparent from the following detailed specification, appended claims, and attached drawings.

Referring to the drawings wherein like characters indicate like parts throughout the several views.

Figure 1:
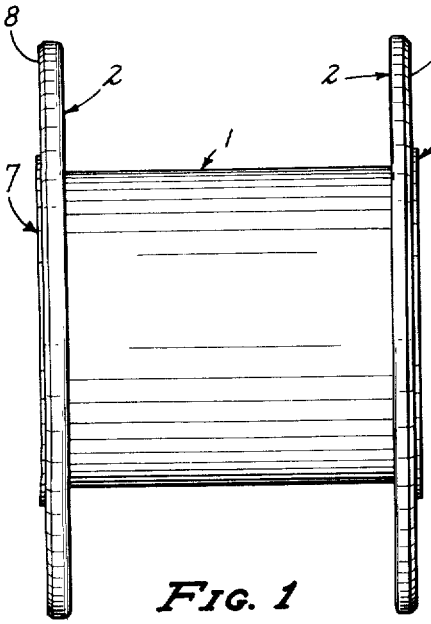
FIG. 1 is a view in front elevation of our novel spool.
Figure 2:
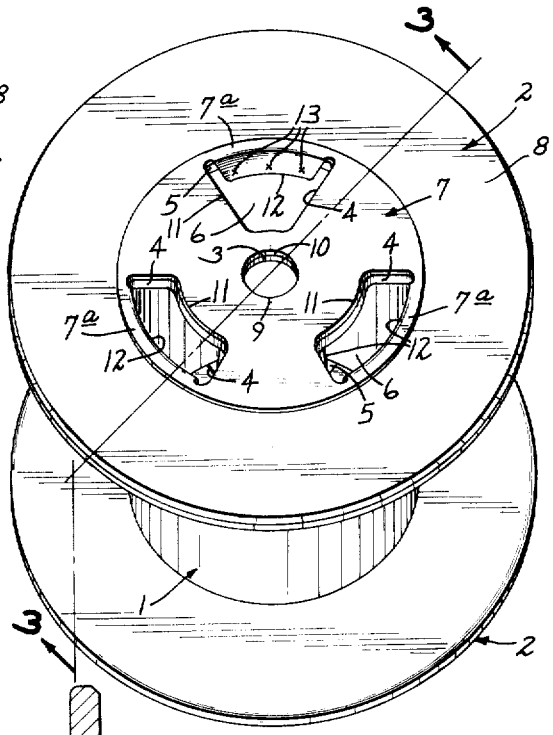
FIG. 2 is a perspective view.

Referring with greater particularity to the drawings, our novel invention comprises a winding element, shown as being in the nature of a cylindrical tube 1 preferably formed from sheet steel or the like. Abutting the opposite ends of the cylindrical winding element 1 are diametrically enlarged parallel flange-like heads 2, which may be formed of any suitable metallic or non-metallic material. In practice, we have found that a product sold in sheet form and known commercially as Super-Wood serves nicely for this purpose.

Each of the heads 2 is provided with a central opening 3 of a diameter greatly less than the diameter of the winding element 1, said openings 3 being concentric with each other and with the axis of the winding element 1. Furthermore, each of the heads 2, radially intermediate the central openings 3 therein and the adjacent edge of the winding element 1, are provided with circumferentially spaced transverse openings 4 therethrough which, preferably and as shown, are circumferentially elongated to permit insertion of the hand for the purpose of facilitating lifting for transportation and the like. Each of the circumferentially spaced openings defines radially outer surfaces 5 which are in substantial alignment with and form outward extensions of the inner surface 6 of the winding element 1, for a purpose which will hereinafter become apparent.

A pair of clamping or anchoring plates, each identified in its entirety by the numeral 7 *and including circumferentially spaced portions 7a,* are provided, one each overlying an outer surface 8 of one of the heads 2. As shown, said clamping plates 7 are annular in shape, the external diameter thereof being greater than the diameter of the adjacent end of the winding element 1. The central openings 9 in the clamping plates 7 are defined by axially inwardly extended bearing flanges 10 which are snugly received within the central openings 3 in the heads 2. Clamping plates 7 likewise are formed to provide circumferentially spaced openings 11 which register generally with the openings 4 in its cooperating head 2.

Figure 3:
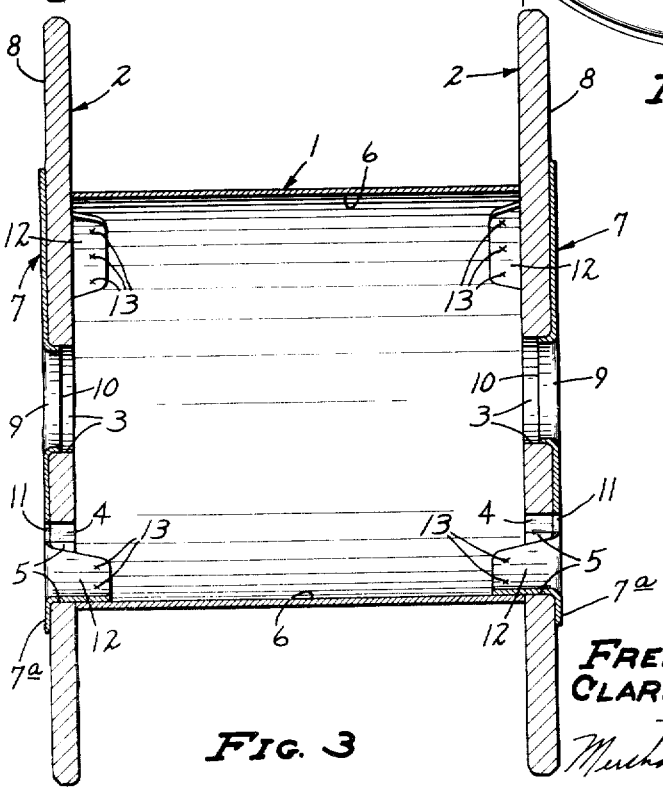
FIG. 3 is a fragmentary sectional view taken on the line 3—3 of FIG. 2.

The radially outer limits of the circumferentially spaced openings 11 in the anchoring plates 7 are defined by integrally formed axially inwardly extending anchoring tongues 12 which project through the circumferentially spaced openings 4 in the heads 2, closely overlying the radially outer edges 5 thereof. As indicated particularly in FIG. 3, the inwardly projecting ends of the anchoring tongues 12 overlie the opposite ends of the winding element 1 and are rigidly secured thereto, by spot welding or the like, as indicated at 13.

Our invention has been thoroughly tested and found to be completely satisfactory for the accomplishment of the above objects, and while we have disclosed a commercial embodiment thereof, we wish it to be understood that our invention is capable of modification without departure from the scope and spirit of the appended claims.

What we claim is:

1. In a device of the class described, a tubular winding element having a generally circular cross section, diametrically enlarged parallel flange-like heads in abutting relationship with opposite ends of said winding element, said heads having central openings therein of considerably less diameter than that of said winding element, said central openings being concentric to each other and to said winding element, said heads intermediate their central openings and the periphery of said winding element having circumferentially spaced transverse hand receiving openings therethrough the radially outer surfaces of which are in substantial alignment with the interior surface of said winding element, a pair of clamping plates one each overlying the axially outer surface of one of said heads, said clamping plates having central openings therein concentric with the central openings in said heads and having outer diameters greater than the adjacent end of said winding element, each of said clamping plates having circumferentially spaced hand receiving openings which register generally with the circumferentially spaced hand receiving openings in its cooperating head and having circumferentially spaced anchoring tongues which project through the circumferentially spaced hand receiving openings in said heads, each of said tongues being rigidly secured to the adjacent end portion of said winding element.

2. The structure defined in claim 1 in which the central openings in said clamping plates are defined by axially inwardly extended integral bearing flanges which are snugly received within the central openings in said heads.

*3. In a device of the class described, a tubular winding element having a generally circular cross section, diametrically enlarged parallel flange-like heads in abutting re-*

*lationship with opposite ends of said winding element, said heads having central openings therein of considerably less diameter than that of said winding element, said central openings being concentric to each other and to said winding element, said heads intermediate their central openings and the periphery of said winding element having circumferentially spaced transverse hand receiving openings therethrough the radially outer surfaces of which are in substantial alignment with the interior surface of said winding element, clamping means associated with each of said heads and including circumferentially spaced plate-like portions overlying the axially outer surface of their associated heads and circumferentially spaced anchoring tongues integral with said circumferentially spaced plate-like portions which project through the circumferentially spaced hand-receiving openings in said heads, each of said tongues being rigidly secured to the adjacent end portion of said winding element.*

References Cited in the file of this patent or the original patent

UNITED STATES PATENTS

| | | |
|---|---|---|
| 1,802,104 | Bilger et al. | Apr. 21, 1931 |
| 1,999,379 | Tompkins | Apr. 30, 1935 |
| 2,121,234 | Howsam | June 21, 1938 |
| 2,139,557 | Moretti | Dec. 6, 1938 |
| 2,238,731 | Howsam | Apr. 15, 1941 |

FOREIGN PATENTS

| | | |
|---|---|---|
| 278,217 | Great Britain | Oct. 6, 1927 |